(12) United States Patent
Shah et al.

(10) Patent No.: US 11,512,191 B2
(45) Date of Patent: Nov. 29, 2022

(54) POLYOLEFIN ELASTOMER BLENDS FOR ELASTOMERIC FILMS

(71) Applicant: PolyOne Corporation, Avon Lake, OH (US)

(72) Inventors: Ketan Shah, Gurnee, IL (US); Cesar Cruz, Woodstock, IL (US)

(73) Assignee: Avient Corporation, Avon Lake, OH (US)

( * ) Notice: Subject to any disclaimer, the term of this patent is extended or adjusted under 35 U.S.C. 154(b) by 71 days.

(21) Appl. No.: 16/762,719

(22) PCT Filed: Nov. 9, 2018

(86) PCT No.: PCT/US2018/059938
§ 371 (c)(1),
(2) Date: May 8, 2020

(87) PCT Pub. No.: WO2019/094667
PCT Pub. Date: May 16, 2019

(65) Prior Publication Data
US 2021/0171748 A1   Jun. 10, 2021

Related U.S. Application Data

(60) Provisional application No. 62/584,705, filed on Nov. 10, 2017.

(51) Int. Cl.
| | | |
|---|---|---|
| C08L 23/08 | (2006.01) | |
| C08K 5/00 | (2006.01) | |
| C08L 23/14 | (2006.01) | |
| C08L 23/16 | (2006.01) | |
| C08L 23/20 | (2006.01) | |
| C08L 25/08 | (2006.01) | |
| C08L 53/00 | (2006.01) | |

(52) U.S. Cl.
CPC ........ *C08L 23/0815* (2013.01); *C08K 5/0025* (2013.01); *C08L 23/14* (2013.01); *C08L 23/16* (2013.01); *C08L 23/20* (2013.01); *C08L 25/08* (2013.01); *C08L 53/00* (2013.01); *C08L 2203/02* (2013.01); *C08L 2203/16* (2013.01); *C08L 2205/02* (2013.01); *C08L 2205/035* (2013.01); *C08L 2207/04* (2013.01)

(58) Field of Classification Search
CPC ........ C08L 53/025; C08L 23/142; C08K 5/01
See application file for complete search history.

(56) References Cited

U.S. PATENT DOCUMENTS

| | | | |
|---|---|---|---|
| 7,319,077 B2 | 1/2008 | Mehta et al. | |
| 8,067,501 B2 | 11/2011 | Fiscus et al. | |
| 8,071,681 B2 * | 12/2011 | Iyer | A61M 5/2429 525/97 |
| 8,846,204 B2 | 9/2014 | Lu et al. | |
| 9,752,027 B2 | 9/2017 | Sasaki et al. | |
| 2003/0092846 A1 * | 5/2003 | Zhao | C08L 23/16 525/242 |
| 2003/0194575 A1 * | 10/2003 | Tau | C08L 23/142 428/515 |
| 2004/0151445 A1 * | 8/2004 | Martinsson | G02B 6/4427 385/100 |
| 2007/0170160 A1 * | 7/2007 | Witten | B23K 26/0613 219/121.71 |
| 2011/0281994 A1 | 11/2011 | Eguchi et al. | |
| 2015/0175793 A1 | 6/2015 | DeMarco et al. | |
| 2015/0353719 A1 * | 12/2015 | Dalal | B32B 27/32 428/523 |
| 2016/0053143 A1 * | 2/2016 | Himmelberger | C08L 91/00 525/54.4 |
| 2016/0060443 A1 * | 3/2016 | Hoya | B32B 27/32 524/528 |
| 2020/0224419 A1 * | 7/2020 | Boss | E04D 1/22 |

FOREIGN PATENT DOCUMENTS

| | | | |
|---|---|---|---|
| JP | 2008247945 A | 10/2008 | |
| JP | 2013035888 * | 1/2013 | |
| KR | 20150126733 A | 11/2015 | |
| WO | 2002036651 A1 | 10/2002 | |
| WO | 2005049670 A1 | 6/2005 | |
| WO | 2007081491 A1 | 7/2007 | |
| WO | 2007142720 A1 | 12/2007 | |
| WO | 2016003657 A1 | 1/2016 | |
| WO | WO-2016003657 A1 * | 1/2016 | ......... B29C 45/0001 |

OTHER PUBLICATIONS

Vistamaxx™ propylenebased elastomers for higher processing flexibility at lower costs in elastic hygiene film; https://www.exxonmobilchemical.com/; Retrieved May 15, 2017.
New Metallocene TP Elastomers Tackle Films, Fibers, TPOs; Plastics Technology; Oct. 1, 2003.
Vistamaxx™ propylene-based elastomers: an introduction; ExxonMobil Chemical; 2012.
TPE Toughens PP, SEBS While Retaining Clarity; Plastics Technology; Apr. 1, 2009.

* cited by examiner

*Primary Examiner* — Mark S Kaucher
(74) *Attorney, Agent, or Firm* — David V. Monateri; Emily E. Vlasek; Michael J. Sambrook

(57) ABSTRACT

A thermoplastic elastomer compound includes a polyolefin elastomer blend of at least two different polyolefin elastomers, styrene-ethylene/butylene-styrene block copolymer, and plasticizer. The compound has a Melt Flow Rate (230° C., 2.16 kg) of no less than about 5 g/10 min and a Melt Flow Rate (190° C., 2.16 kg) of no less than about 1 g/10 min. Elastomeric films formed from the compound can be used in place of elastomeric films based on styrene-isoprene-styrene (SIS) block copolymers to make components of disposable hygiene articles.

18 Claims, No Drawings

POLYOLEFIN ELASTOMER BLENDS FOR ELASTOMERIC FILMS

CLAIM OF PRIORITY

This application claims the benefit of U.S. Provisional Patent Application Ser. No. 62/584,705 filed on Nov. 10, 2017, which is hereby incorporated by reference in its entirety.

FIELD OF THE INVENTION

This invention relates to thermoplastic elastomer compounds including polyolefin elastomer blends. This invention also relates to elastomeric films which are useful for making components of disposable hygiene articles.

BACKGROUND OF THE INVENTION

Demand exists for disposable hygiene articles and related personal care products. Generally, disposable hygiene articles can include baby care products such as disposable diapers, adult incontinence care products such as disposable undergarments, and feminine care products such as disposable sanitary pads.

Disposable hygiene articles typically include one or more components made from elastomeric films. To be useful as a component of disposable hygiene articles, elastomeric films often must meet specific requirements for properties such as good softness, very high elasticity, good tensile strength, low hysteresis, low stress-relaxation, and desirable levels of tension at various levels of extension. Further, elastomeric films typically must be capable of high speed processing to enable efficient manufacturing of disposable hygiene articles. Lastly, elastomeric films and the materials from which they are made ideally must be very low cost because the hygiene articles are designed to be disposable.

Conventionally, disposable hygiene articles are made using elastomeric films formed from materials such as polyisoprene rubber and styrene-isoprene-styrene (SIS) block copolymers. However, these materials have drawbacks. For example, SIS-based elastomeric films can be susceptible to thermal, oxidative, and/or ultraviolet (UV) degradation, which can limit usefulness of SIS-based elastomeric films during both manufacturing and end-product use. Additionally, in some instances, SIS-based elastomeric films can have levels of stress-relaxation and hysteresis that are undesirable.

Notwithstanding the drawbacks of conventional elastomeric films such as SIS-based elastomeric films, there are barriers to adoption of elastomeric films formed from materials other than SIS for use in making disposable hygiene articles. For example, changes to a material for purposes of improving performance properties of the elastomeric film formed from the material can negatively affect the high speed processability of the elastomeric film. Likewise, changes to a material for purposes of improving high speed processability of the elastomeric film formed from the material can negatively affect the performance properties of the elastomeric film.

Moreover, commercial manufacturing of disposable hygiene articles and their elastomeric film components can involve relatively costly equipment and relatively complex processes. In many instances, at least some manufacturing equipment or processes are designed or adapted specifically for use of conventional elastomeric films such as SIS-based elastomeric films. Disadvantageously, use of materials other than SIS could require prohibitively costly changes to the incumbent manufacturing equipment or the processes.

SUMMARY OF THE INVENTION

Consequently, a need exists for thermoplastic elastomer compounds and elastomeric films formed therefrom which are based on elastomers other than styrene-isoprene-styrene (SIS) block copolymers but are compatible with and capable of good high processing using incumbent manufacturing equipment and processes designed or adapted specifically for conventional elastomeric films such SIS-based elastomeric films. Moreover, a need exists for such thermoplastic elastomer compounds and elastomeric films formed therefrom which are not only capable of good high speed processing, but which also possess properties desirable for disposable hygiene articles and are relatively low cost.

The aforementioned needs are met by one or more aspects of the present invention.

It has been found that, by combining a blend of at least two different polyolefin elastomers with styrene-ethylene/butylene-styrene block copolymer and plasticizer to provide thermoplastic elastomer compounds having a Melt Flow Rate (230° C., 2.16 kg) of no less than about 5 g/10 min and a Melt Flow Rate (190° C., 2.16 kg) of no less than about 1 g/10 min, it is possible to achieve elastomeric films that are capable of good high speed processing on incumbent manufacturing equipment and processes designed or adapted specifically for conventional elastomeric films such as SIS-based elastomeric films. Advantageously, in addition to being capable of such good high speed processing, such thermoplastic elastomer compounds and elastomeric films formed therefrom possess properties desirable for disposable hygiene articles, such as good softness, very high elasticity, good tensile strength, low hysteresis, low stress-relaxation, and desirable levels of tension at various levels of extension, while also being relatively low cost.

In some aspects, the present invention is directed to thermoplastic elastomer compounds that include a polyolefin elastomer blend of at least two different polyolefin elastomers, styrene-ethylene/butylene-styrene block copolymer, and plasticizer. The compounds have a Melt Flow Rate (230° C., 2.16 kg) of no less than about 5 g/10 min and a Melt Flow Rate (190° C., 2.16 kg) of no less than about 1 g/10 min.

In other aspects, the present invention is directed to elastomeric films formed from thermoplastic elastomer compounds as described herein.

In further aspects, the present invention is directed to disposable hygiene articles including elastomeric films as described herein.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to thermoplastic elastomer compounds. In other embodiments, the present invention is directed to elastomeric films. In further embodiments, the present invention is directed to disposable hygiene articles. Required and optional features of these and other embodiments of the present invention are described.

As used herein, the term "compound" means a composition or mixture resulting from melt mixing, or compounding, a neat polymer and at least one other ingredient including but not limited to one or more additives, or one or more other polymers, or both.

As used herein, the terms "formed from" or "forming" mean, with respect to an article (e.g., a film) and a compound, that the article is molded, extruded, calendered, thermoformed, or otherwise shaped from the compound. As such, the terms "formed from" or "forming" mean, in some embodiments, the article can comprise, consist essentially of, or consist of, the compound.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "Melt Flow Rate" means a melt flow rate according to ASTM D1238 at specified testing conditions.

As used herein, the term "Melt Flow Rate (190° C., 2.16 kg)" means a Melt Flow Rate at testing conditions of a temperature of 190° C. and a gravimetric weight of 2.16 kg.

As used herein, the term "Melt Flow Rate (230° C., 2.16 kg)" means a Melt Flow Rate at testing conditions of a temperature of 230° C. and a gravimetric weight of 2.16 kg.

Thermoplastic Elastomer Compound

Thermoplastic elastomer compounds of the present invention include a polyolefin elastomer blend of at least two different polyolefin elastomers, styrene-ethylene/butylene-styrene block copolymer, and plasticizer.

According to the present invention, the thermoplastic elastomer compounds have a Melt Flow Rate (230° C., 2.16 kg) of no less than about 5 g/10 min and a Melt Flow Rate (190° C., 2.16 kg) of no less than about 1 g/10 min.

In some embodiments, the compound has a Melt Flow Rate (230° C., 2.16 kg) of no less than about 6 g/10 min. In other embodiments, the compound has a Melt Flow Rate (230° C., 2.16 kg) from about 6 to about 15, or from about 7 to about 15, or from about 8 to about 15 g/10 min.

In some embodiments, the compound has a Melt Flow Rate (190° C., 2.16 kg) of no less than about 1.5 g/10 min. In other embodiments, the compound has a Melt Flow Rate (190° C., 2.16 kg) from about 1.5 to about 10 g/10 min. In further embodiments, the compound has a Melt Flow Rate (190° C., 2.16 kg) from about 2 to about 10 g/10 min.

While not intending to be bound by theory, it is believed that compounds having both a Melt Flow Rate (230° C., 2.16 kg) of no less than about 5 g/10 min and a Melt Flow Rate (190° C., 2.16 kg) of no less than about 1 g/10 min generally can be expected to be capable of good high speed processing on incumbent manufacturing equipment and processes designed or adapted specifically for conventional elastomeric films such as SIS-based elastomeric films for use in making disposable hygiene articles.

In some embodiments, the compound is free of styrene-isoprene-styrene (SIS) block copolymer given that the thermoplastic elastomer compound of the present invention and elastomeric films formed therefrom can be used instead of SIS-based elastomeric films.

Polyolefin Elastomer Blend

Thermoplastic elastomer compounds of the present invention include a polyolefin elastomer blend.

According to the present invention, the polyolefin elastomer blend includes at least two different types or grades of polyolefin elastomers.

For example, in some embodiments, the polyolefin elastomer blend includes a first polyolefin elastomer and a second polyolefin elastomer different from the first polyolefin elastomer. In other embodiments, the polyolefin elastomer blend includes a first polyolefin elastomer, a second polyolefin elastomer different from the first polyolefin elastomer, and a third polyolefin elastomer different from each of the first polyolefin elastomer and the second polyolefin elastomer. In further embodiments, the polyolefin elastomer blend further includes a fourth polyolefin elastomer different from each of the first polyolefin elastomer, the second polyolefin elastomer, and the third polyolefin elastomer. Likewise, in even further embodiments, the polyolefin elastomer blend further includes any number of additional polyolefin elastomers each of which are different from each of the other polyolefin elastomers included in the polyolefin elastomer blend, provided that the resulting thermoplastic elastomer compounds have a Melt Flow Rate (230° C., 2.16 kg) of no less than about 5 g/10 min and a Melt Flow Rate (190° C., 2.16 kg) of no less than about 1 g/10 min. However, in some embodiments, the polyolefin elastomer blend includes no more than four, or, no more than three, or, no more than two, different polyolefin elastomers.

While not intending to be limited by theory, it is generally believed that including polyolefin elastomer in the thermoplastic elastomer compound in increasingly greater amounts can have the effect of improving high speed processability, but also it can negatively affect desirable end-use properties such good softness, low stress-relaxation, and low hysteresis. Conversely, it is generally believed that including SEBS block copolymer and plasticizer in the thermoplastic elastomer compound in increasingly greater amounts can have the effect of improving desirable end-use properties such good softness, low stress-relaxation, and low hysteresis, but also it can negatively affect high speed processability. It is further generally believed that by using a blend of at least two different types or grades of polyolefin elastomers, as opposed to using only one type or grade of polyolefin elastomer, it is possible to achieve good high speed processing at a relatively lower total amount of polyolefin elastomer(s) included in the compound, which, in turn, can minimize any negative effect on desirable end-use properties such good softness, low stress-relaxation, and low hysteresis.

Polyolefin elastomers suitable for use in the polyolefin elastomer blend of the present invention include conventional or commercially available polyolefin elastomers. Each of the at least two different polyolefin elastomers can be selected such that, when combined as described herein with the at least one other polyolefin elastomer, styrene-ethylene/butylene-styrene block copolymer, and plasticizer, the resulting thermoplastic elastomer compound has a Melt Flow Rate (230° C., 2.16 kg) of no less than about 5 g/10 min and a Melt Flow Rate (190° C., 2.16 kg) of no less than about 1 g/10 min. Additionally, suitable polyolefin elastomers can be selected, at least in part, to provide other properties desirable for the end-use application.

Non-limiting examples of suitable polyolefin elastomer include propylene-based elastomers, ethylene/α-olefin random copolymers, and combinations thereof.

Suitable propylene-based elastomers include those described in International Appl. Pub. No. WO 2005/049670 filed by ExxonMobil Chemical.

For example, in some embodiments, suitable propylene-based elastomers are comprised of (a) at least about 60 weight percent of propylene-derived units, (b) at least about 6 weight percent of ethylene-derived units, and (c) from about 0.3 to about 10 weight percent of diene-derived units, based on a combined weight of the propylene-derived units, the ethylene-derived units, and the diene-derived units.

Non-limiting examples of commercial available propylene-based elastomers include those available under the VISTAMAXX brand from ExxonMobil Chemical, including but not limited to the following grades: 2330; 3000; 3020; 3980; 6102; 6202; and 6502.

VISTAMAXX 2330 polypropylene-based elastomers can be further characterized as propylene-based elastomer comprising about 13 weight percent of ethylene-derived units and having a Melt Flow Rate (230° C., 2.16 kg) of about 290 g/10 min and a Shore A hardness of about 77 according to ASTM D2240.

VISTAMAXX 3000 polypropylene-based elastomers can be further characterized as propylene-based elastomer comprising about 11 weight percent of ethylene-derived units and having a Melt Flow Rate (190° C., 2.16 kg) of about 3.7 g/10 min and a Shore D hardness of about 27 according to ASTM D2240.

VISTAMAXX 3020 polypropylene-based elastomers can be further characterized as propylene-based elastomer comprising about 11 weight percent of ethylene-derived units and having a Melt Flow Rate (190° C., 2.16 kg) of about 1.1 g/10 min and a Shore D hardness of about 34 according to ASTM D2240.

VISTAMAXX 3980 polypropylene-based elastomers can be further characterized as propylene-based elastomer comprising about 9 weight percent of ethylene-derived units and having a Melt Flow Rate (190° C., 2.16 kg) of about 3.6 g/10 min and a Shore D hardness of about 34 according to ASTM D2240.

VISTAMAXX 6102 polypropylene-based elastomers can be further characterized as propylene-based elastomers including about 16 weight percent of ethylene-derived units and having a Melt Flow Rate (190° C., 2.16 kg) of about 1.4 g/10 min and a Shore A hardness of about 66 according to ASTM D2240.

VISTAMAXX 6202 polypropylene-based elastomers can be further characterized as propylene-based elastomers including about 15 weight percent of ethylene-derived units and having a Melt Flow Rate (190° C., 2.16 kg) of about 9.1 g/10 min and a Shore A hardness of about 66 according to ASTM D2240.

VISTAMAXX 6502 polypropylene-based elastomers can be further characterized as propylene-based elastomers including about 13 weight percent of ethylene-derived units and having a Melt Flow Rate (190° C., 2.16 kg) of about 21 g/10 min and a Shore A hardness of about 71 according to ASTM D2240.

Suitable ethylene/α-olefin random copolymers include random copolymers formed by polymerizing ethylene with one or more $C_3$-$C_{10}$ α-olefins such as propylene, 1-butene, 1-pentene, 1-hexene, 4-methyl-1-pentene, 1-heptene, 1-octene, 1-nonene, and 1-decene.

For example, in some embodiments, suitable ethylene/α-olefin random copolymers include ethylene/propylene copolymers, ethylene/butene copolymers, ethylene/hexane copolymers, and ethylene/octene copolymers.

Non-limiting examples of commercial available ethylene/α-olefin random copolymers include those available under the ENGAGE brand from Dow Chemical; and those available under the EXACT brand from ExxonMobil Chemical.

SEBS Block Copolymer

Thermoplastic elastomer compounds of the present invention include styrene-ethylene/butylene-styrene (SEBS) block copolymer.

SEBS block copolymers suitable for use in the present invention include conventional and commercially available SEBS block copolymers. Suitable SEBS block copolymer can be selected such that, when combined as described herein with the polyolefin elastomer blend and plasticizer, the resulting thermoplastic elastomer compound has a Melt Flow Rate (230° C., 2.16 kg) of no less than about 5 g/10 min and a Melt Flow Rate (190° C., 2.16 kg) of no less than about 1 g/10 min.

In some embodiments, suitable SEBS block copolymer is selected from low molecular weight SEBS block copolymer or medium molecular weight SEBS block copolymer, as represented by SEBS block copolymer having a Melt Flow Rate (230° C., 5 kg) of no greater than about 1 g/10 min.

For example, suitable SEBS block copolymer can have a weight average molecular weight that is, in some embodiments, less than about 500,000, and, in other embodiments, less than about 200,000, and, in further embodiments, less than about 100,000, and, in even further embodiments, less than about 75,000.

Non-limiting examples of commercially available SEBS block copolymer include those available under the KRATON brand from Kraton Polymers, such as grades G1641, G1650, G1651, and G1654; those available under the SEPTON brand from Kuraray, such as the 8000 series and including grade 8004; and those available under the GLOBALPRENE brand from LCY Chemical, such a grades 9550 and 9551.

Plasticizer

Thermoplastic elastomer compounds of the present invention include plasticizer.

Plasticizers suitable for use in the present invention include conventional and commercially available plasticizers. Suitable plasticizers can be selected such that, when combined as described herein with the polyolefin elastomer blend and SEBS block copolymer, the resulting thermoplastic elastomer compound has a Melt Flow Rate (230° C., 2.16 kg) of no less than about 5 g/10 min and a Melt Flow Rate (190° C., 2.16 kg) of no less than about 1 g/10 min.

In some embodiments, suitable plasticizers include any conventional oil, such as white mineral oil, vegetable oil, synthetic oil, and the like, which is capable of plasticizing the polyolefin elastomer and/or the SEBS block copolymer.

Non-limiting examples of commercially available plasticizer oils include those available under the PURETOL 550 brand from Petro-Canada, and those available under the PRIMOL 382 brand from ExxonMobil.

Optional Additives

In some embodiments, thermoplastic elastomer compounds of the present invention further include one or more optional additives.

Suitable optional additives include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the elastomeric film formed therefrom. The amount should not be wasteful of the additive nor detrimental to the processing or performance of the thermoplastic elastomer compound and/or the elastomeric film formed therefrom.

Non-limiting examples of additives suitable for use in the present invention include one or more selected from anti-oxidants and stabilizers; bonding agents; colorants such as pigments or dyes; impact modifiers; non-elastomeric thermoplastic polymer; tackifiers; ultraviolet light absorbers; and waxes.

In some embodiments, non-elastomeric thermoplastic polymer is selected from non-elastomeric polyolefin thermoplastic polymers, non-elastomeric polystyrene-based thermoplastic polymers, and combinations thereof.

Non-elastomeric thermoplastic polymer can be included, for example, to adjust processability or other properties in the thermoplastic elastomer compound. Suitable non-elastomeric thermoplastic polymer should be compatible with the polyolefin elastomer blend and the SEBS block copolymer.

Suitable non-elastomeric thermoplastic polymers include conventional and commercially available non-elastomeric polyolefin resins, including homopolymers, copolymers, blends of polymers, mixtures of polymers, alloys of polymers, and combinations thereof. Non-limiting examples of non-elastomeric polyolefin polymers include polyethylene (including low-density (LDPE), high-density (HDPE), ultra-high molecular weight (UHDPE), linear-low-density (LLDPE), very-low density (VLDPE), etc.), polypropylene, polybutylene, polyhexalene, and polyoctene. In some embodiments, non-elastomeric polyolefin polymers is selected from high density polyethylene (HDPE) and/or polypropylene homopolymer (PP). Such polyolefins are commercially available from a number of sources.

Suitable non-elastomeric thermoplastic polymers also include conventional and commercially available non-elastomeric polystyrene resins, including homopolymers, copolymers, blends of polymers, mixtures of polymers, alloys of polymers, and combinations thereof. Non-limiting examples of non-elastomeric polystyrene-based polymers include polystyrene. Such polystyrenes are commercially available from a number of sources.

Notwithstanding the above, in some embodiments, the thermoplastic elastomer compound of the present invention is free of non-elastomeric thermoplastic polymer, for example, non-elastomeric polyolefins and non-elastomeric polystyrenes, as an additive ingredient.

Ranges of Ingredients in the TPE Compounds

Table 1 below shows ranges of ingredients, in weight percent, which can be acceptable, desirable, and preferable for some embodiments of thermoplastic elastomer (TPE) compounds of the present invention. Weight percent is based on total weight the thermoplastic elastomer compound.

Thermoplastic elastomer compounds of the present invention, in some embodiments, can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

| Thermoplastic Elastomer Compounds (Weight Percent) | | | |
|---|---|---|---|
| Ingredient | Acceptable | Desirable | Preferable |
| Polyolefin Elastomer Blend | 20-85 | 50-82 | 75-79 |
| SEBS Block Copolymer | 10-50 | 11-30 | 12-20 |
| Plasticizer | 5-40 | 7-20 | 9-16 |
| Optional Additives | 0-12 | 0-9 | 0-5 |

Processing

The preparation of thermoplastic elastomer compounds of the present invention is uncomplicated once the proper ingredients have been selected. The compound can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later forming, extrusion, molding, thermoforming, foaming, calendering, and/or other processing into plastic articles.

Subsequent forming such as extrusion, molding, thermoforming, calendering, and/or other processing techniques are well known to those skilled in the art of thermoplastics polymer engineering. Without undue experimentation but with reference to publications such as "Extrusion, The Definitive Processing Guide and Handbook", "Handbook of Molded Part Shrinkage and Warpage", "Specialized Molding Techniques", "Rotational Molding Technology", and "Handbook of Mold, Tool and Die Repair Welding", all part of the *Plastics Design Library* series published by Elsevier, one can make articles of any conceivable shape and appearance using compounds of the present invention.

In some embodiments, thermoplastic elastomer compounds of the present invention are formed by extrusion processes, including co-extrusion processes, into elastomeric films.

Usefulness of the Invention

Thermoplastic elastomer compounds of the present invention and elastomeric films formed therefrom can be useful for making any elastomeric film component of disposable hygiene articles.

Non-limiting examples of disposable hygiene articles include baby care products such as disposable diapers, adult incontinence care products such as disposable undergarments, and feminine care products such as disposable sanitary pads.

Non-limiting examples of elastomeric film components of disposable hygiene articles include pull tabs, side tabs, side panels, waistbands, laminate layers, chassis elements, and the like.

Using thermoplastic elastomer compounds of the present invention and elastomeric films formed therefrom, which are based on a polyolefin elastomer blend rather than styrene-isoprene-styrene (SIS) block copolymers, it is possible to provide a "drop-in" solution that is capable of good high speed processing using incumbent manufacturing equipment and processes designed or adapted specifically for using SIS-based elastomeric films to make disposable hygiene articles.

Furthermore, thermoplastic elastomer compounds of the present invention and elastomeric films made therefrom possess properties, such as good softness, very high elasticity, good tensile strength, low hysteresis, low stress-relaxation, and desirable levels of tension at various levels of extension, which are desirable for various components of disposable hygiene articles.

Additionally, thermoplastic elastomer compounds of the present invention and elastomeric films made therefrom can be at least cost-competitive with conventional elastomeric films such as SIS-based elastomeric films.

Some aspects of the present invention are directed to elastomeric films formed from thermoplastic elastomer compounds as described herein.

In some embodiments, elastomeric films are monolayer films formed from thermoplastic elastomer compounds as described herein. In other embodiments, elastomeric films are incorporated into laminate structures or formed into multilayer films, such as coextruded films, including at least one layer formed from thermoplastic elastomer compounds as described herein and at least one other layer formed from a different material, for example, a polyolefin-based material.

Other aspects of the present invention are directed to disposable hygiene articles including elastomeric films formed from thermoplastic elastomer compounds as described herein.

In some embodiments, disposable hygiene articles are selected from baby care products such as disposable diapers, adult incontinence care products such as disposable undergarments, and feminine care products such as disposable sanitary pads.

EXAMPLES

Non-limiting examples of thermoplastic elastomer compounds of various embodiments of the present invention are provided.

Table 2 below shows sources of ingredients for the thermoplastic elastomer compounds of the Comparative Examples and the Examples.

TABLE 2

| Ingredient Description | Brand | Source |
|---|---|---|
| Polyolefin elastomer | VISTAMAXX 3020 | ExxonMobil Chemical |
| Polyolefin elastomer | VISTAMAXX 6102 | ExxonMobil Chemical |
| Polyolefin elastomer | VISTAMAXX 6202 | ExxonMobil Chemical |
| Polyolefin elastomer | VISTAMAXX 6502 | ExxonMobil Chemical |
| SEBS block copolymer | SEPTON 8004 | Kuraray |
| SEBS block copolymer | GLOBALPRENE 9550 | LCY Chemical |
| SEBS block copolymer | GLOBALPRENE 9551 | LCY Chemical |
| SEBS block copolymer | KRATON G1641 | Kraton Polymers |
| SEBS block copolymer | KRATON G1650 | Kraton Polymers |
| SEBS block copolymer | KRATON G1654 | Kraton Polymers |
| Polypropylene homopolymer | PRO-FAX 6331 | LyondellBasell |
| Polypropylene homopolymer | PRO-FAX PD702 | LyondellBasell |
| White mineral oil | 380 USP White Oil | (multiple) |
| White mineral oil | PURETOL 550 Oil | Petro-Canada |
| Antioxidant | IRGANOX 1010 | BASF |
| Antioxidant | IRGAFOS 168 | BASF |

Examples of the thermoplastic elastomer compound were compounded and extruded as pellets on a twin screw extruder at typical mixing and extruding conditions. Subsequently, the extruded pellets were formed into plaques or films and then evaluated for the reported properties.

Table 3 below shows the formulations and certain properties of Comparative Examples A to C.

TABLE 3

| | Example | | | | | |
|---|---|---|---|---|---|---|
| | A | | B | | C | |
| Ingredient | Wt. Parts | Wt. % | Wt. Parts | Wt. % | Wt. Parts | Wt. % |
| SEPTON 8004 | 43.50 | 43.50 | — | — | — | — |
| GLOBALPRENE 9550 | — | — | — | — | 10.00 | 10.00 |
| GLOBALPRENE 9551 | — | — | 36.00 | 36.00 | 26.00 | 26.00 |
| 380 USP White Oil | 31.50 | 31.50 | 20.00 | 20.00 | 20.00 | 20.00 |
| VISTAMAXX 6102 | 19.00 | 19.00 | 5.60 | 5.60 | 5.60 | 5.60 |
| VISTAMAXX 3020 | 5.60 | 5.60 | 10.00 | 10.00 | 10.00 | 10.00 |
| VISTAMAXX 6502 | — | — | 28.00 | 28.00 | 28.00 | 28.00 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.00 | 100.00 | 100.00 | 100.00 | 100.00 | 100.00 |
| Properties | | | | | | |
| Good High Speed Processing | No | | No | | No | |
| Melt Flow Rate (230° C., 2.16 kg) (g/10 min) (ASTM D1238) | 4.50 | | 4.20 | | 3.50 | |
| Melt Flow Rate (190° C., 2.16 kg) (g/10 min) (ASTM D1238) | 0.75 | | 2.00 | | 1.73 | |
| Hardness (Shore A) (ASTM D2240) | 41.9 | | 48.0 | | 51.5 | |
| Tensile Strength (psi) (ASTM D638) | 841.6 | | 1016.4 | | 1058.8 | |
| Tensile Elongation (%) (ASTM D638) | 794.7 | | 745.4 | | 749.9 | |

Table 4 below shows the formulations and certain properties of Comparative Examples D to G.

TABLE 4

| | \multicolumn{6}{c}{Example} | | | | | |
|---|---|---|---|---|---|---|
| | D | | E | | F | |
| Ingredient | Wt. Parts | Wt. % | Wt. Parts | Wt. % | Wt. Parts | Wt. % |
| GLOBALPRENE 9550 | 27.00 | 27.00 | 32.00 | 32.00 | 20.00 | 20.00 |
| GLOBALPRENE 9551 | — | — | 9.00 | 9.00 | — | — |
| PROFAX 6331 | — | — | — | — | 12.00 | 12.00 |
| PROFAX PD702 | — | — | — | — | — | — |
| 380 USP White Oil | 36.00 | 36.00 | 36.00 | 36.00 | 36.00 | 36.00 |
| VISTAMAXX 6102 | 6.00 | 6.00 | 6.00 | 6.00 | 5.00 | 5.00 |
| VISTAMAXX 3020 | 7.00 | 7.00 | 7.00 | 7.00 | — | — |
| VISTAMAXX 6502 | 9.60 | 9.60 | 9.60 | 9.60 | 5.60 | 5.60 |
| KRATON 1654 | 12.00 | 12.00 | — | — | 15.00 | 15.00 |
| KRATON 1641 | 2.00 | 2.00 | — | — | 6.00 | 6.00 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.00 | 100.00 | 100.00 | 100.00 | 100.00 | 100.00 |
| Properties | | | | | | |
| Good High Speed Processing | No | | No | | No | |
| Melt Flow Rate (230° C., 2.16 kg) (g/10 min) (ASTM D1238) | 2.80 | | 4.5 | | 1.5 | |
| Melt Flow Rate (190° C., 2.16 kg) (g/10 min) (ASTM D1238) | 0.60 | | 0.97 | | 0.37 | |
| Hardness (Shore A) (ASTM D2240) | (not reported) | | (not reported) | | (not reported) | |
| Tensile Strength (psi) (ASTM D638) | (not reported) | | (not reported) | | (not reported) | |
| Tensile Elongation (%) (ASTM D638) | (not reported) | | (not reported) | | (not reported) | |

| | Example G | |
|---|---|---|
| Ingredient | Wt. Parts | Wt. % |
| GLOBALPRENE 9550 | 15.00 | 15.00 |
| GLOBALPRENE 9551 | — | — |
| PROFAX 6331 | — | — |
| PROFAX PD702 | 12.00 | 12.00 |
| 380 USP White Oil | 36.00 | 36.00 |
| VISTAMAXX 6102 | 10.60 | 10.60 |
| VISTAMAXX 3020 | — | — |
| VISTAMAXX 6502 | 5.00 | 5.00 |
| KRATON 1654 | 15.00 | 15.00 |
| KRATON 1641 | 6.00 | 6.00 |
| IRGANOX 1010 | 0.20 | 0.20 |
| IRGAFOS 168 | 0.20 | 0.20 |
| TOTAL | 100.00 | 100.00 |
| Properties | | |
| Good High Speed Processing | No | |
| Melt Flow Rate (230° C., 2.16 kg) (g/10 min) (ASTM D1238) | 2.47 | |
| Melt Flow Rate (190° C., 2.16 kg) (g/10 min) (ASTM D1238) | 0.82 | |
| Hardness (Shore A) (ASTM D2240) | (not reported) | |

TABLE 4-continued

| | |
|---|---|
| Tensile Strength (psi) (ASTM D638) | (not reported) |
| Tensile Elongation (%) (ASTM D638) | (not reported) |

Table 5 below shows the formulations and certain properties of Examples 1 to 3.

TABLE 5

| | Example | | | | | |
|---|---|---|---|---|---|---|
| | 1 | | 2 | | 3 | |
| Ingredient | Wt. Parts | Wt. % | Wt. Parts | Wt. % | Wt. Parts | Wt. % |
| GLOBALPRENE 9550 | 32.00 | 32.00 | 32.00 | 32.00 | 30.00 | 30.00 |
| GLOBALPRENE 9551 | 7.00 | 7.00 | 9.00 | 9.00 | 10.00 | 10.00 |
| 380 USP White Oil | 36.00 | 36.00 | — | — | 37.60 | 37.60 |
| PURETOL 550 Oil | — | — | 36.00 | 36.00 | — | — |
| VISTAMAXX 6102 | 15.00 | 15.00 | 6.00 | 6.00 | 5.00 | 5.00 |
| VISTAMAXX 3020 | 5.00 | 5.00 | 7.00 | 7.00 | 8.00 | 8.00 |
| VISTAMAXX 6502 | 4.60 | 4.60 | 9.60 | 9.60 | 9.00 | 9.00 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.00 | 100.00 | 100.00 | 100.00 | 100.00 | 100.00 |
| Properties | | | | | | |
| Good High Speed Processing | Yes | | Yes | | Yes | |
| Melt Flow Rate (230° C., 2.16 kg) (g/10 min) (ASTM D1238) | 7.20 | | 6.00 | | 6.70 | |
| Melt Flow Rate (190° C., 2.16 kg) (g/10 min) (ASTM D1238) | 1.50 | | 1.15 | | 1.63 | |
| Hardness (Shore A) (ASTM D2240) | 35.1 | | 37.3 | | 36.2 | |
| Tensile Strength (psi) (ASTM D638) | 653 | | 755 | | 727 | |
| Tensile Elongation (%) (ASTM D638) | 839 | | 796 | | 782 | |

Table 6 below shows the formulations and certain properties of Examples 4 to 9.

TABLE 6

| | Example | | | | | |
|---|---|---|---|---|---|---|
| | 4 | | 5 | | 6 | |
| Ingredient | Wt. Parts | Wt. % | Wt. Parts | Wt. % | Wt. Parts | Wt. % |
| GLOBALPRENE 9550 | 13.05 | 13.01 | 17.40 | 17.36 | 13.05 | 13.01 |
| 380 USP White Oil | 9.45 | 9.42 | 12.60 | 12.57 | 9.45 | 9.42 |
| VISTAMAXX 6202 | 35.70 | 35.59 | — | — | 16.70 | 16.65 |
| VISTAMAXX 6102 | 35.80 | 35.69 | 43.60 | 43.50 | 40.00 | 39.88 |
| VISTAMAXX 6502 | 4.20 | 4.19 | 24.00 | 23.94 | 19.00 | 18.94 |
| VISTAMAXX 3020 | 1.70 | 1.69 | 2.24 | 2.23 | 1.70 | 1.69 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.30 | 100.00 | 100.24 | 100.00 | 100.30 | 100.00 |
| Properties | | | | | | |
| Good High Speed Processing | Yes | | Yes | | Yes | |

TABLE 6-continued

|  | | | |
|---|---|---|---|
| Melt Flow Rate (230° C., 2.16 kg) (g/10 min) (ASTM D1238) | 6.3 | 5 | 6.5 |
| Melt Flow Rate (190° C., 2.16 kg) (g/10 min) (ASTM D1238) | 2.9 | 2.5 | 3.4 |
| Hardness (Shore A) (ASTM D2240) | (not reported) | (not reported) | (not reported) |
| Tensile Strength (psi) (ASTM D638) | (not reported) | (not reported) | (not reported) |
| Tensile Elongation (%) (ASTM D638) | (not reported) | (not reported) | (not reported) |

| | Example | | | | | |
|---|---|---|---|---|---|---|
| | 7 | | 8 | | 9 | |
| Ingredient | Wt. Parts | Wt. % | Wt. Parts | Wt. % | Wt. Parts | Wt. % |
| GLOBALPRENE 9550 | 13.05 | 13.01 | 13.05 | 13.01 | 13.05 | 13.02 |
| 380 USP White Oil | 9.45 | 9.42 | 9.45 | 9.42 | 9.45 | 9.43 |
| VISTAMAXX 6202 | 16.70 | 16.65 | 21.00 | 20.94 | — | — |
| VISTAMAXX 6102 | 40.00 | 39.88 | 40.70 | 40.58 | 23.20 | 23.14 |
| VISTAMAXX 6502 | 19.00 | 18.94 | 14.00 | 13.96 | 35.00 | 34.91 |
| VISTAMAXX 3020 | 1.70 | 1.69 | 1.70 | 1.69 | 19.15 | 19.10 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.30 | 100.00 | 100.30 | 100.00 | 100.25 | 100.00 |

Properties

| | | | |
|---|---|---|---|
| Good High Speed Processing | Yes | Yes | Yes |
| Melt Flow Rate (230° C., 2.16 kg) (g/10 min) (ASTM D1238) | 6.6 | 6.6 | 7.6 |
| Melt Flow Rate (190° C., 2.16 kg) (g/10 min) (ASTM D1238) | 3.1 | 2.87 | 3.6 |
| Hardness (Shore A) (ASTM D2240) | (not reported) | (not reported) | (not reported) |
| Tensile Strength (psi) (ASTM D638) | (not reported) | (not reported) | (not reported) |
| Tensile Elongation (%) (ASTM D638) | (not reported) | (not reported) | (not reported) |

Table 7 below shows the formulations and certain properties of Examples 10 to 14.

TABLE 7

| | Example | | | | | |
|---|---|---|---|---|---|---|
| | 10 | | 11 | | 12 | |
| Ingredient | Wt. Parts | Wt. % | Wt. Parts | Wt. % | Wt. Parts | Wt. % |
| KRATONG1650 | 13.05 | 13.01 | 13.05 | 13.01 | 26.10 | 26.06 |
| 380 USP White Oil | 9.45 | 9.42 | 9.45 | 9.42 | 18.90 | 18.87 |
| VISTAMAXX 6202 | 17.00 | 16.95 | 28.70 | 28.61 | — | — |
| VISTAMAXX 6102 | 35.70 | 35.60 | 34.80 | 34.70 | 51.40 | 51.32 |
| VISTAMAXX 6502 | 23.00 | 22.93 | 1220 | 12.16 | — | — |
| VISTAMAXX 3020 | 1.70 | 1.69 | 1.70 | 1.69 | 3.36 | 3.35 |
| IRGANOX 1010 | 0.20 | 0.20 | 0.20 | 0.20 | 0.20 | 0.20 |
| IRGAFOS 168 | 0.20 | 0.20 | 0.20 | 0.20 | 0.20 | 0.20 |
| TOTAL | 100.30 | 100.00 | 100.30 | 100.00 | 100.16 | 100.00 |

Properties

| | | | |
|---|---|---|---|
| Good High Speed Processing | Yes | Yes | Yes |

TABLE 7-continued

| | | | |
|---|---|---|---|
| Melt Flow Rate (230° C., 2.16 kg) (g/10 min) (ASTM D1238) | 9.8 | 9.59 | 5.62 |
| Melt Flow Rate (190° C., 2.16 kg) (g/10 min) (ASTM D1238) | 4.25 | 4.10 | 1.65 |
| Hardness (Shore A) (ASTM D2240) | 59.0 | (not reported) | 50.4 |
| Tensile Strength (psi) (ASTM D638) | 1180 | (not reported) | 994 |
| Tensile Elongation (%) (ASTM D638) | 950 | (not reported) | 926 |

| | Example | | | |
|---|---|---|---|---|
| | 13 | | 14 | |
| Ingredient | Wt. Parts | Wt. % | Wt. Parts | Wt. % |
| KRATON G1650 | 21.75 | 21.71 | 17.40 | 17.36 |
| 380 USP White Oil | 15.75 | 15.72 | 12.60 | 12.57 |
| VISTAMAXX 6202 | — | — | — | — |
| VISTAMAXX 6102 | 59.50 | 59.38 | 67.60 | 67.44 |
| VISTAMAXX 6502 | — | — | — | — |
| VISTAMAXX 3020 | 2.80 | 2.79 | 2.24 | 2.23 |
| MB3150 | — | — | — | — |
| SCLAIR 2908 | — | — | — | — |
| IRGANOX 1010 | 0.20 | 0.20 | 0.20 | 0.20 |
| IRGAFOS 168 | 0.20 | 0.20 | 0.20 | 0.20 |
| TOTAL | 100.20 | 100.00 | 100.24 | 100.00 |
| Properties | | | | |
| Good High Speed Processing | Yes | | Yes | |
| Melt Flow Rate (230° C., 2.16 kg) (g/10 min) (ASTM D1238) | 5.38 | | 5.66 | |
| Melt Flow Rate (190° C., 2.16 kg) (g/10 min) (ASTM D1238) | 1.77 | | 2.19 | |
| Hardness (Shore A) (ASTM D2240) | 52.2 | | (not reported) | |
| Tensile Strength (psi) (ASTM D638) | 1139 | | (not reported) | |
| Tensile Elongation (%) (ASTM D638) | 925 | | (not reported) | |

Without undue experimentation, those having ordinary skill in the art can utilize the written description of the present invention, including the Examples, to formulate thermoplastic elastomer compounds and make elastomeric films which are based on polyolefin elastomer blends rather than styrene-isoprene-styrene (SIS) block copolymers but which are compatible with manufacturing equipment and processes designed or adapted specifically for SIS-based elastomeric films, while possessing properties desirable for making disposable hygiene articles and while also being relatively low cost.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. An elastomeric film, the elastomeric film formed from a thermoplastic elastomer compound comprising:
   (a) a polyolefin elastomer blend comprising:
      (i) a first polyolefin elastomer; and
      (ii) a second polyolefin elastomer different from the first polyolefin elastomer;
   (b) styrene-ethylene/butylene-styrene block copolymer; and
   (c) plasticizer;
   wherein the thermoplastic elastomer compound has a Melt Flow Rate (230° C., 2.16 kg) of no less than about 5 g/10 min and a Melt Flow Rate (190° C., 2.16 kg) of no less than about 1 g/10 min.

2. The elastomeric film of claim 1, wherein the thermoplastic elastomer compound has a Melt Flow Rate (230° C., 2.16 kg) of no less than about 6 g/10 min.

3. The elastomeric film of claim 1, wherein the thermoplastic elastomer compound has a Melt Flow Rate (190° C., 2.16 kg) of no less than about 1.5 g/10 min.

4. The elastomeric film of claim 1, wherein the thermoplastic elastomer compound has a Melt Flow Rate (230° C., 2.16 kg) from about 6 to about 15 g/10 min.

5. The elastomeric film of claim 1, wherein the thermoplastic elastomer compound has a Melt Flow Rate (190° C., 2.16 kg) from about 1.5 to about 10 g/10 min.

6. The elastomeric film of claim 1, wherein the polyolefin elastomer blend further comprises a third polyolefin elastomer different from each of the first polyolefin elastomer and the second polyolefin elastomer.

7. The elastomeric film of claim 6, wherein the polyolefin elastomer blend further comprises a fourth polyolefin elastomer different from each of the first polyolefin elastomer, the second polyolefin elastomer, and the third polyolefin polymer.

8. The elastomeric film of claim 1, wherein one or more of the polyolefin elastomers of the polyolefin elastomer blend is selected from the group consisting of propylene-based elastomer, ethylene/α-olefin random copolymer, and combinations thereof.

9. The elastomeric film of claim 1, wherein one or more of the polyolefin elastomers of the polyolefin elastomer blend is selected from propylene-based elastomer comprising (a) at least about 60 weight percent of propylene-derived units, (b) at least about 6 weight percent of ethylene-derived units, and (c) from about 0.3 to about 10 weight percent of diene-derived units, based on a combined weight of the propylene-derived units, the ethylene-derived units, and the diene-derived units.

10. The elastomeric film of claim 1, wherein one or more of the polyolefin elastomers of the polyolefin elastomer blend is selected from the group consisting of:
   (a) propylene-based elastomer comprising about 13 weight percent of ethylene-derived units and having a Melt Flow Rate (190° C., 2.16 kg) of about 21 g/10 min and a Shore A hardness of about 71 according to ASTM D2240;
   (b) propylene-based elastomer comprising about 15 weight percent of ethylene-derived units and having a Melt Flow Rate (190° C., 2.16 kg) of about 9.1 g/10 min and a Shore A hardness of about 66 according to ASTM D2240;
   (c) propylene-based elastomer comprising about 16 weight percent of ethylene-derived units and having a Melt Flow Rate (190° C., 2.16 kg) of about 1.4 g/10 min and a Shore A hardness of about 66 according to ASTM D2240; and
   (d) propylene-based elastomer comprising about 11 weight percent of ethylene-derived units and having a Melt Flow Rate (190° C., 2.16 kg) of about 1.1 g/10 min and a Shore D hardness of about 34 according to ASTM D2240.

11. The elastomeric film of claim 1, wherein the thermoplastic elastomer compound further comprises one or more additives selected from the group consisting of antioxidants and stabilizers; bonding agents; colorants; impact modifiers; non-elastomeric thermoplastic polymers; tackifiers; ultraviolet light absorbers; waxes; and combinations thereof.

12. The elastomeric film of claim 11, wherein the non-elastomeric thermoplastic polymer is selected from non-elastomeric polyolefin polymers, non-elastomeric polystyrene polymers, and combinations thereof.

13. The elastomeric film of claim 1, wherein the thermoplastic elastomer compound comprises:
   (a) from about 20 to about 85 weight percent, by weight of the thermoplastic elastomer compound, of the polyolefin elastomer blend;
   (b) from about 10 to about 50 weight percent, by weight of the thermoplastic elastomer compound, of the styrene-ethyl ene/butylene-styrene block copolymer;
   (c) from about 5 to about 40 weight percent, by weight of the thermoplastic elastomer compound, of the plasticizer; and
   (d) from 0 to about 12 weight percent, by weight of the thermoplastic elastomer compound, of one or more additives selected from the group consisting of antioxidants and stabilizers, bonding agents, colorants, impact modifiers, non-elastomeric thermoplastic polymers, tackifiers, ultraviolet light absorbers, waxes, and combinations thereof.

14. The elastomeric film of claim 1, wherein the thermoplastic elastomer compound is free of styrene-isoprene-styrene block copolymer.

15. A multilayer film or laminate structure comprising at least one film according to claim 1.

16. A disposable hygiene article comprising at least one component comprising an elastomeric film formed from a thermoplastic elastomer compound comprising:
   (a) a polyolefin elastomer blend comprising:
      (i) a first polyolefin elastomer; and
      (ii) a second polyolefin elastomer different from the first polyolefin elastomer;
   (b) styrene-ethylene/butylene-styrene block copolymer; and
   (c) plasticizer;
   wherein the thermoplastic elastomer compound has a Melt Flow Rate (230° C., 2.16 kg) of no less than about 5 g/10 min and a Melt Flow Rate (190° C., 2.16 kg) of no less than about 1 g/10 min.

17. The elastomeric film of claim 1, wherein the elastomeric film is a product formed by the extrusion of the thermoplastic elastomer compound.

18. The elastomeric film of claim 13, wherein the thermoplastic elastomer compound comprises:
   from about 9 to about 16 weight percent, by weight of the thermoplastic elastomer compound, of the plasticizer.

* * * * *